United States Patent
Fang et al.

(10) Patent No.: US 10,488,727 B2
(45) Date of Patent: Nov. 26, 2019

(54) ARRAY SUBSTRATE INCLUDING INSULATED PIXEL ELECTRODES, LIQUID CRYSTAL DISPLAY PANEL, AND PIXEL CHARGING METHOD

(71) Applicant: Xiamen Tianma Micro-Electronics Co., Ltd., Xiamen (CN)

(72) Inventors: Liting Fang, Xiamen (CN); Qiong Song, Xiamen (CN); Rong Chen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 15/702,049

(22) Filed: Sep. 12, 2017

(65) Prior Publication Data
US 2018/0314121 A1 Nov. 1, 2018

(30) Foreign Application Priority Data
Apr. 27, 2017 (CN) .......................... 2017 1 0288010

(51) Int. Cl.
G02F 1/1362 (2006.01)
G02F 1/1368 (2006.01)
(Continued)

(52) U.S. Cl.
CPC ...... *G02F 1/136286* (2013.01); *G02F 1/1368* (2013.01); *G02F 1/13624* (2013.01);
(Continued)

(58) Field of Classification Search
CPC combination set(s) only.
See application file for complete search history.

(56) References Cited

U.S. PATENT DOCUMENTS

2008/0100555 A1* 5/2008 Yoon ................ G02F 1/134336
345/92
2008/0297676 A1* 12/2008 Kimura ............... G02F 1/13624
349/39

FOREIGN PATENT DOCUMENTS

CN 102292666 A 12/2011
CN 103488014 A 1/2014

OTHER PUBLICATIONS

Chinese Office Action dated May 24, 2019 for corresponding Chinese Patent Application No. 201710288010.3.

* cited by examiner

*Primary Examiner* — Lauren Nguyen
(74) *Attorney, Agent, or Firm* — Tarolli, Sundheim, Covell & Tummino LLP

(57) ABSTRACT

Provided are an array substrate, a liquid crystal display panel, and a pixel charging method. The array substrate comprises: a plurality of pixel units distributed in a matrix, a first thin-film transistor, and a second thin-film transistor; the first thin-film transistor and the second thin-film transistor corresponding to each pixel unit; each pixel unit comprising a first specific sub-pixel unit, the first specific sub-pixel unit comprising a first pixel electrode and a second pixel electrode insulated from the first pixel electrode; for each pixel unit, a drain electrode of the first thin-film transistor electrically connected with the first pixel electrode, a drain electrode of the second thin-film transistor electrically connected with the second pixel electrode. The present technical solution is mainly for use in the eye protection mode of liquid crystal display products, for improving picture smear problem caused by increase of response time of liquid crystal.

12 Claims, 11 Drawing Sheets

(51) Int. Cl.
 *G02F 1/163* (2006.01)
 *G02F 1/1343* (2006.01)
(52) U.S. Cl.
 CPC ............ *G02F 2001/134345* (2013.01); *G02F 2001/1635* (2013.01)

ARRAY SUBSTRATE INCLUDING INSULATED PIXEL ELECTRODES, LIQUID CRYSTAL DISPLAY PANEL, AND PIXEL CHARGING METHOD

CROSS-REFERENCE TO RELATED APPLICATIONS

The present application claims priority to Chinese Patent Application No. 201710288010.3, filed on Apr. 27, 2017, the content of which is incorporated herein by reference in its entirety.

TECHNICAL FIELD

The present disclosure relates to the field of liquid crystal display technologies and, particularly, relates to an array substrate, a liquid crystal display panel, and a pixel charging method.

BACKGROUND

In recent years, the development of digital products has brought convenience to people's life and, at the same time, the blue light hazard cause adverse influence on people's eyesight during display of the digital product. In order to remove the blue light, the existing liquid crystal display product provides an eye protection display mode, in this mode, the respective transmittance of the red, green and blue colors is changed by regulating the pixel electrode voltage corresponding to the respective sub-pixel unit of the red, green and blue colors, so as to reduce the blue light transmittance.

During implementation of the present invention, the inventor found at least the following problems existing in the prior art:

In the existing eye protection display mode, the blue light transmittance is reduced by reducing the pixel electrode voltage of the respective sub-pixel unit of the green and blue colors. However, in the liquid crystal display product, the response time of the liquid crystal is in negative correlation with the pixel electrode voltage, accordingly, in the eye protection display mode, the reduction of the pixel electrode voltage will increase the response time of the liquid crystal, and the extended response time will cause the problem of picture smear.

SUMMARY

In view of the above, the present disclosure provides an array substrate, a liquid crystal display panel, and a pixel charging method, which can improve, in the eye protection mode, the problem of picture smear caused by extension of response time of the liquid crystal.

In a first aspect, the present disclosure provides a n array substrate, comprising: a plurality of pixel units distributed in a matrix; a first thin-film transistor, and a second thin-film transistor; wherein the first thin-film transistor and the second thin-film transistor correspond to each of the plurality of pixel units; each of the plurality of pixel units comprises a first specific sub-pixel unit, and the first specific sub-pixel unit comprises a first pixel electrode and a second pixel electrode insulated from the first pixel electrode; and for each of the plurality of pixel units, a drain electrode of the first thin-film transistor is electrically connected with the first pixel electrode, and a drain electrode of the second thin-film transistor is electrically connected with the second pixel electrode.

In a second aspect, the present disclosure provides a liquid crystal display panel including the array substrate as described above.

In a third aspect, the present disclosure provides a pixel charging method, for application in the array substrate as described above, the method including: in a normal display mode, inputting an identical data voltage to the first pixel electrode and the second pixel electrode; and in an eye protection display mode, inputting a voltage of 0V to the first pixel electrode, and inputting a data voltage to the second pixel electrode.

In the array substrate, liquid crystal display panel, and pixel charging method provided by the present disclosure, the first specific sub-pixel unit includes a first pixel electrode and a second pixel electrode insulated from the first pixel electrode. The first pixel electrode is controlled by a first thin-film transistor, and the second pixel electrode is controlled by a second thin-film transistor. When realizing the eye protection display mode, a voltage of 0V is transmitted to the first pixel electrode by the first thin-film transistor, a data voltage is transmitted to the second pixel electrode by the second thin-film transistor, the liquid crystal corresponding to the first pixel electrode does not deflect, the liquid crystal corresponding to the second pixel electrode deflects with an angle corresponding to the data voltage, so that the first specific sub-pixel unit can emit light with low transmittance. Compared with the prior art, the objective of reducing the transmittance is realized by disabling the deflection of the liquid crystal corresponding to the first pixel electrode, accordingly, there is no need to reduce the data voltage value of the pixel electrode for reducing the transmittance, therefore, while the transmittance is reduced to realize the eye protection display mode, the response time of the liquid crystal corresponding to the pixel electrode will not be extended due the reduction of the data voltage value, which therefore improves the problem of picture smear caused by the extension of the response time of the liquid crystal.

BRIEF DESCRIPTION OF DRAWINGS

In order to better understand the technical solutions of the present disclosure, embodiments of the present disclosure are described in detail as follows with reference to the accompanying drawings. It should be noted that, the described embodiments are merely a part of the embodiment of the present disclosure but not all of the embodiments. Based on the embodiments in the present disclosure, all other embodiments obtained by those skilled in the art without any creative efforts shall fall into the protection scope of the present disclosure.

DESCRIPTION OF EMBODIMENTS

In order to better understand the technical solutions of the present disclosure, embodiments of the present disclosure are described in details as follows with reference to the accompanying drawings.

It should be noted that, the described embodiments are merely a part of the embodiment of the present disclosure but not all of the embodiments. Based on the embodiments in the present disclosure, all other embodiments obtained by those skilled in the art without any creative efforts shall fall into the protection scope of the present disclosure.

The terms used in the embodiments are merely intended to illustrate the specific embodiments, but not to limit the present disclosure. An expression of "a", "an" "the" or "such" in a singular form used in the embodiments and claims of the present disclosure is also intended to include the plural form thereof, unless otherwise noted.

Figure 1:
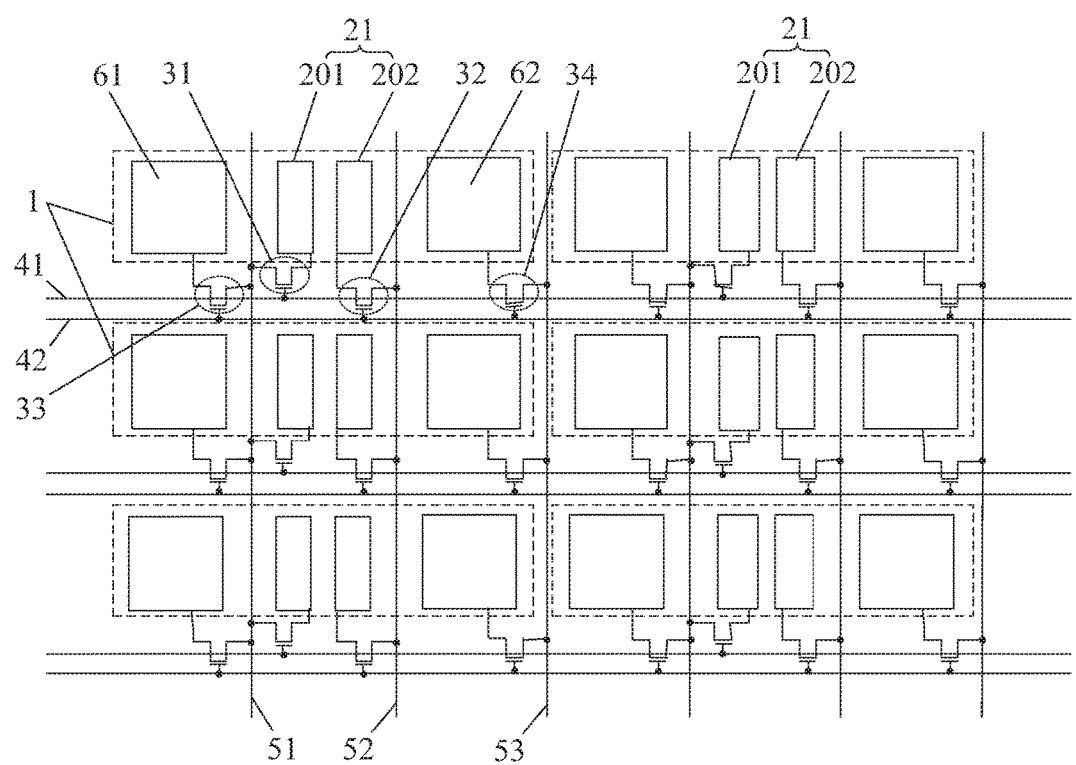
FIG. 1 illustrates a structural schematic diagram of an array substrate according to an embodiment of the present disclosure.
Figure 2:
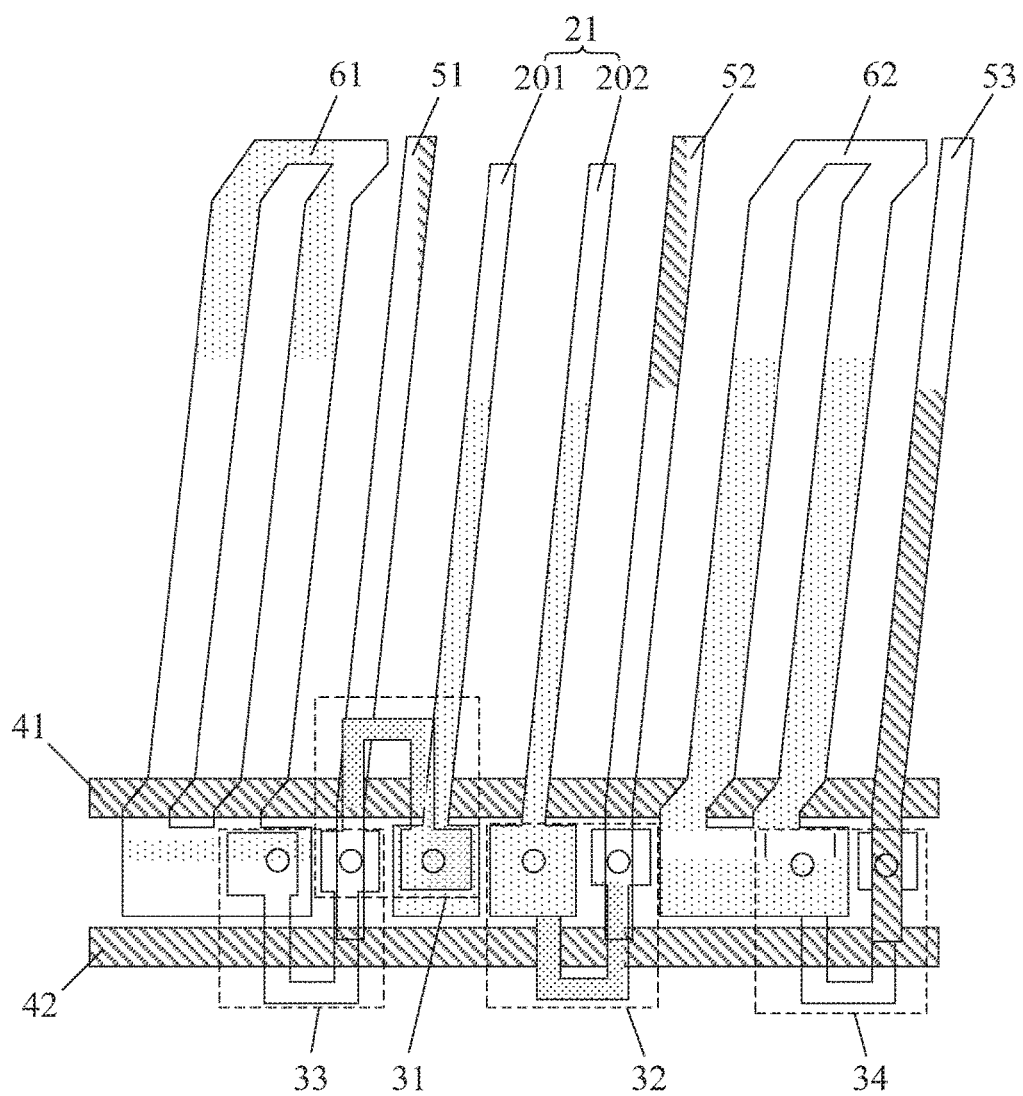
FIG. 2 illustrates a structural schematic diagram of one pixel unit in FIG. 1.

As shown in FIG. 1 and FIG. 2, FIG. 1 illustrates a structural schematic diagram of an array substrate according to an embodiment of the present disclosure; and FIG. 2 illustrates a structural schematic diagram of one pixel unit in FIG. 1. An embodiment of the present disclosure provides an array substrate including a plurality of pixel units 1 distributed in an array, a first thin-film transistor 31 and a second thin-film transistor 32. Each pixel unit 1 includes a plurality of sub-pixel units. For example, as shown in FIG. 1, three adjacent sub-pixel units constitute one pixel unit 1, and each pixel unit 1 includes a first specific sub-pixel unit 21. The first specific sub-pixel unit 21 includes a first pixel electrode 201 and a second pixel electrode 202 insulated from the first pixel electrode 201. For each pixel unit 1, a drain electrode of the of the first thin-film transistor 31 is electrically connected with the first pixel electrode 201, a drain electrode of the second thin-film transistor 32 is electrically connected with the second pixel electrode 202.

The array substrate can work in a normal display mode and an eye protection display mode. In the normal display mode, when each pixel unit 1 is being charged, under the control of the first thin-film transistor 31 and the second thin-film transistor 32, an identical data voltage is transmitted to the first pixel electrode 201 and the second pixel electrode 202, so that the first pixel electrode 201 and the second pixel electrode 202 in the first specific sub-pixel unit 21 are charged to the same voltage value, thus, the liquid crystal corresponding to the first pixel electrode 201 and the liquid crystal corresponding to the second pixel electrode 202 will deflect with the same angle. As a result, the first specific sub-pixel unit 21 emits light at a normal transmittance, thereby realizing normal display. In the eye protection display mode, when the respective pixel unit 1 is being charged, a voltage of 0V is transmitted to the first pixel electrode 201 under the control of the first thin-film transistor 31, a data voltage is transmitted to the second pixel electrode 202 under the control of the second thin-film transistor 32, then the first pixel electrode 201 is charged to 0V, and thus the liquid crystal corresponding to the first pixel electrode 201 will not deflect, while the second pixel electrode 202 is charged to the data voltage, and thus the liquid crystal corresponding to the second pixel electrode 202 will deflect with an angle corresponding to the data voltage. As a result, the first specific sub-pixel unit 21 emits light at a low transmittance, so as to reduce transmittance of the blue light and thereby protecting the eyes. In the eye protection display mode, the objective of reducing transmittance is realized by disabling the deflection of the liquid crystal corresponding to the first pixel electrode 201, therefore, there is no need to reduce the data voltage transmitted to the second pixel electrode 202, that is, the response time of the liquid crystal corresponding to the second pixel electrode 202 will not be extended due to reduction of the data voltage.

In the array substrate according to an embodiment, the first specific sub-pixel unit includes a first pixel electrode and a second pixel electrode insulated from the first pixel electrode. The first pixel electrode is controlled by the first thin-film transistor, and the second pixel electrode is controlled by the second thin-film transistor. In the eye protection display mode, a voltage of 0V is transmitted to the first pixel electrode by the first thin-film transistor, a data voltage is transmitted to the second pixel electrode by the second thin-film transistor, thus the liquid crystal corresponding to the first pixel electrode does not deflect, and the liquid crystal corresponding to the second pixel electrode deflects with an angle corresponding to the data voltage, so that the first specific sub-pixel unit emits light at a low transmittance. Compared with the prior art, the objective of reducing the transmittance is realized by disabling the deflection of the liquid crystal corresponding to the first pixel electrode, and thus, there is no need to reduce the data voltage of the pixel electrode to reduce the transmittance. Therefore, the response time of the liquid crystal corresponding to the pixel electrode will not be extended due to reduction of the data voltage while the transmittance is reduced to realize the eye protection display mode, thereby solving the problem of the picture smear caused by the extension of the response time of the liquid crystal.

Optionally, as shown in FIG. 1 and FIG. 2, the array substrate further includes: a first gate line 41 and a second gate line 42, wherein the first gate line 41 and the second gate line 42 correspond to each row of the pixel units 1. Every two adjacent rows of pixel units 1 are provided with one first gate line 41 and one second gate line 42 therebetween. In each row of pixel units 1, the gate electrode of the first thin-film transistor 31 is electrically connected with a corresponding first gate line 41, and the gate electrode of the second thin-film transistor 32 is electrically connected with a corresponding second gate line 42. The first thin-film transistor 31 and the second thin-film transistor 32 are controlled by the two gate lines, respectively. In the eye protection display mode, the first pixel electrode 201 and the second pixel electrode 202 are successively charged under the control of the two gate lines, thus, the first pixel electrode 201 and other adjacent pixel electrodes can share one data line, so that the number of the data line will be reduced, and there is no need to provide two separate data lines for the first specific sub-pixel unit 21.

Figure 3:
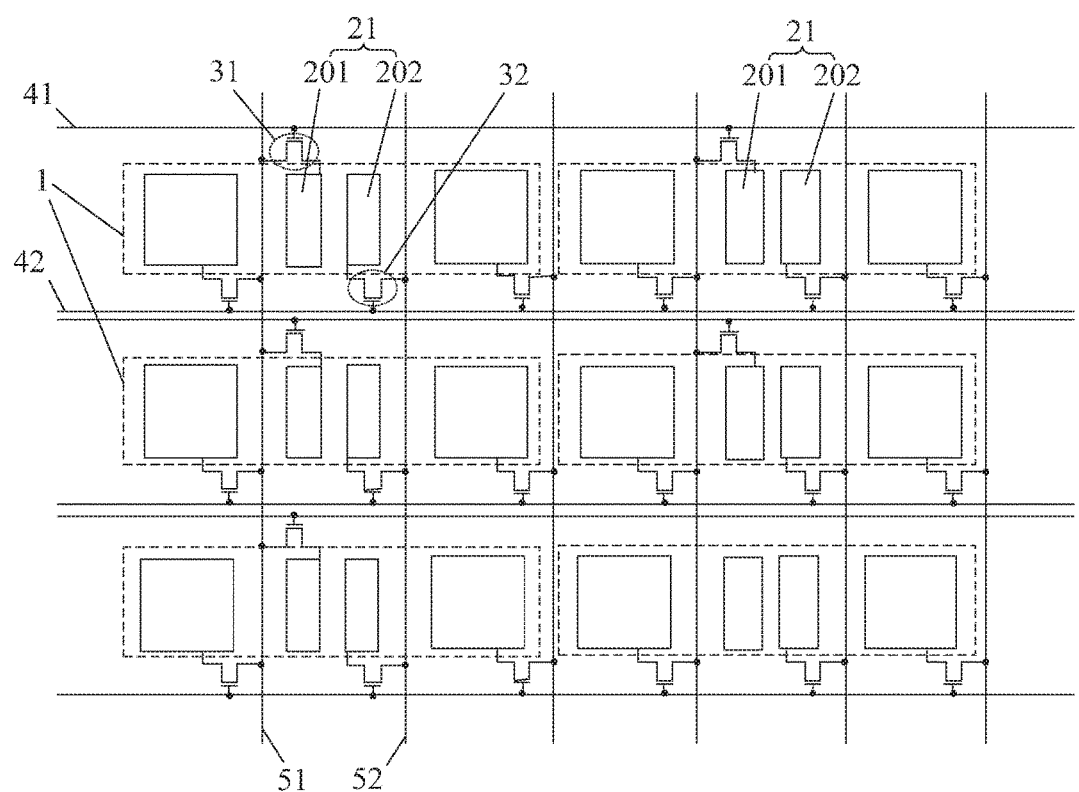
FIG. 3 illustrates a structural schematic diagram of another array substrate according to an embodiment of the present disclosure.

Optionally, FIG. 3 illustrates a structural schematic diagram of another array substrate according to an embodiment of the present disclosure. As shown in FIG. 3, each row of pixel units 1 is located between its corresponding first gate line 41 and second gate line 42; or, as shown in FIG. 1 and FIG. 2, each row of pixel units 1 is located at a same side of its corresponding first gate line 41 and second gate line 42.

Optionally, as shown in FIG. 1, FIG. 2 or FIG. 3, the array substrate further includes: a first data line 51 and a second data line 52, and the first data line 51 and the second data line 52 correspond to each column of the pixel units 1. Each first specific sub-pixel unit 21 is located between its corresponding first data line 51 and second data line 52. The source electrode of the first thin-film transistor 31 is electrically connected with the corresponding first data line 51, the source electrode of the second thin-film transistor 32 is electrically connected with the corresponding second data line 52. In the eye protection display mode, a voltage of 0V is transmitted to the first pixel electrode 201 by the first data line 51, and a data voltage is transmitted to the second pixel electrode 202 by the second data line 52.

Figure 4:
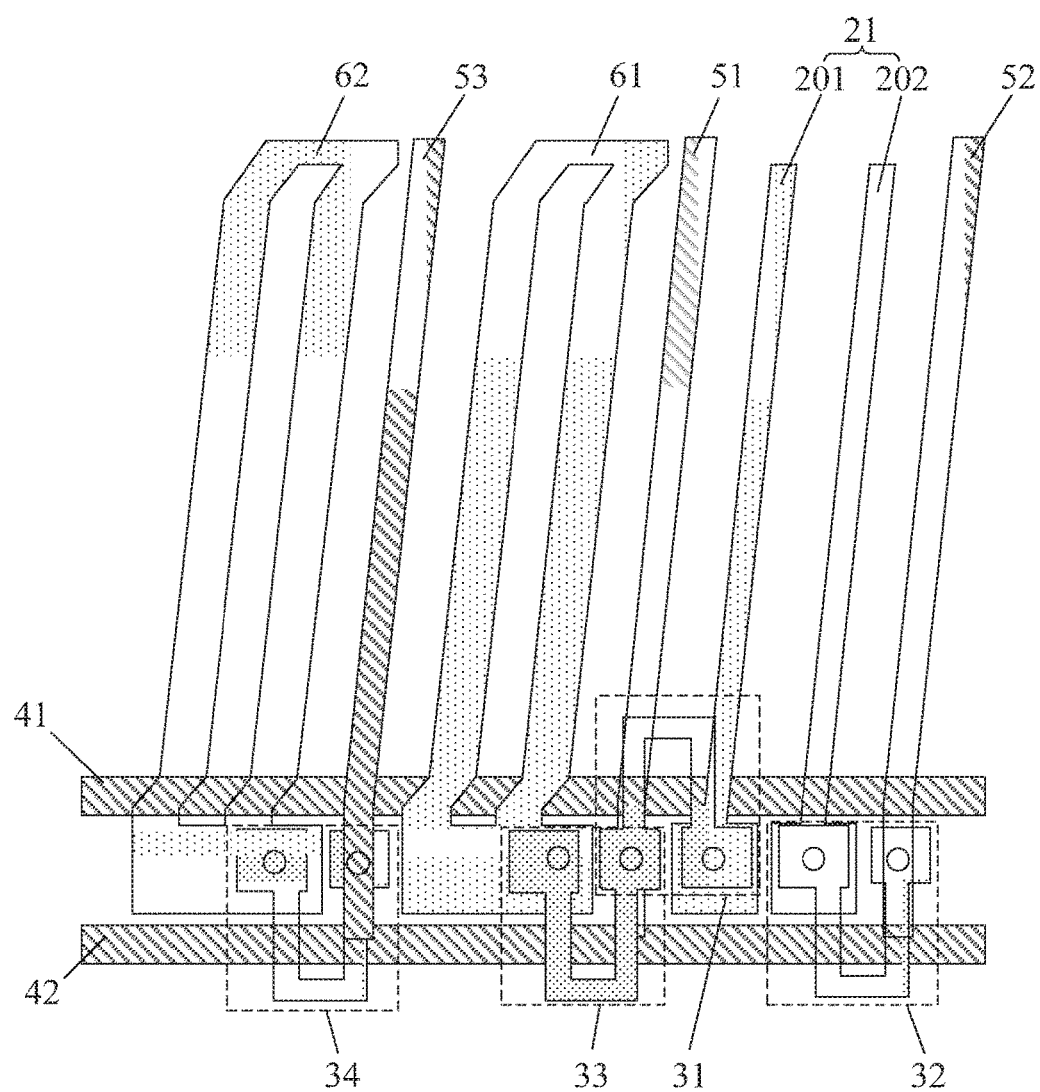
FIG. 4 illustrates a structural schematic diagram of a pixel unit of an array substrate according to an embodiment of the present disclosure.

Optionally, as shown in FIG. 1, FIG. 2 or FIG. 4, FIG. 4 illustrates a structural schematic diagram of a pixel unit of an array substrate according to an embodiment of the present disclosure. Each pixel unit 1 further includes a first non-specific sub-pixel unit 61 adjacent to the first specific sub-pixel unit 21. The first data line 51 is located between the first specific sub-pixel unit 21 and the first non-specific sub-pixel unit 61 in the corresponding column of pixel units 1. The array substrate further includes a third thin-film transistor 33 corresponding to each pixel unit 1. The source electrode of the third thin-film transistor 33 is electrically connected with its corresponding first data line 51, the drain electrode of the third thin-film transistor 33 is electrically connected with a pixel electrode of the corresponding first non-specific sub-pixel unit 61, the gate electrode of the third thin-film transistor 33 is electrically connected with its corresponding second gate line 42. Each pixel unit 1 further includes a second non-specific sub-pixel unit 62 and, correspondingly, the array substrate can further include: a fourth thin-film transistor 34 and a third data line 53 corresponding to each pixel unit 1. The source electrode of the fourth thin-film transistor 34 is electrically connected with the corresponding third data line 53, the drain electrode of the fourth thin-film transistor 34 is electrically connected with a pixel electrode of the second non-specific sub-pixel unit 62, and the gate electrode of the fourth thin-film transistor 34 is electrically connected with the second gate line 42. Under such configuration, the first pixel electrode 201 in the first specific sub-pixel unit 21 and the pixel electrode of the first non-specific sub-pixel unit 61 share a same first data line 51, which saves space for wiring the data line. The driving manner of the array substrate is illustrated as follows with reference to FIG. 1, FIG. 2 or FIG. 4. For example, in the normal display mode, when charging one row of pixel units, the first gate line 41 and the second gate line 42 corresponding to the one row of pixel units successively output a turn-on level; when the first gate line 41 outputs a turn-on level, the first thin-film transistor 31 is turned on, and the first data line 51 transmits a data voltage to the first pixel electrode 201; when the second gate line 42 outputs a turn-on level, the second thin-film transistor 32, the third thin-film transistor 33 and the fourth thin-film transistor 34 are turned on, the first data line 51 transmits a data voltage to the pixel electrode of the first non-specific sub-pixel unit 61, the second data line 52 transmits the data voltage to the second pixel electrode 202 of the first specific sub-pixel unit 21, and the third data line 53 transmits a data voltage to the pixel electrode of the second non-specific sub-pixel unit 62. Thus, after the charging of the row of pixel units is finished, a next row of pixel units will be charged in the same manner. It should be understood that, the normal display mode can also be driven in other manners. For example, the respective first gate lines 41 corresponding to all the rows of pixel unit successively output a turn-on level, so that the respective first data lines 51 successively transmit a data voltage to the first pixel electrode 201 in each row of first specific sub-pixel units 21. After the charging of all the first pixel electrodes 201 is finished, the respective second gate lines 42 corresponding to all the rows of pixel units successively output a turn-on level, so that the first data line 51, the second data line 52 and the third data line 53 transmit a corresponding data voltage to the pixel electrode of the first non-specific sub-pixel unit 6, the second pixel electrode 202 of the first specific sub-pixel unit 21 and the pixel electrode of the second non-specific sub-pixel unit 62, respectively. After the charging of all the pixel electrodes is finished, a next frame will be scanned in the same manner. In the eye protection display mode, when charging one row of pixel units, the first gate line 41 and the second gate line 42 corresponding to the one row of pixel units successively output a turn-on level. When the first gate line 41 outputs a turn-on level, the first thin-film transistor 31 is turned on, the first data line 51 transmits a voltage of 0V to the first pixel electrode 201; when the second gate line 42 outputs a turn-on level, the second thin-film transistor 32, the third thin-film transistor 33 and the fourth thin-film transistor 34 are turned on, and the first data line 51, the second data line 52 and the third data line 53 output a corresponding data voltage to the pixel electrode of the first non-specific sub-pixel unit 61, the second pixel electrode 202 of the first specific sub-pixel unit 21, and the pixel electrode of the second non-specific sub-pixel unit 62, respectively. After charging of the row of pixel units is finished, a next row of pixel units will be charged in the same manner. It should be understood that, the eye protection display mode can also be driven in other manners. For example, the respective second gate lines 42 corresponding to all the rows of pixel units successively out a corresponding turn-on level, so that the first data line 51, the second data line 52 and the third data line 53 respectively output a data voltage to the pixel electrode of the first non-specific sub-pixel unit 61, the second pixel electrode 202 of the first specific sub-pixel unit 21, and the pixel electrode of the second non-specific sub-pixel unit 62, so as to normally scan the display frame. During the normal scanning for the display frame, all the second gate lines 42 output a turn-off level at a specific time, and all the first gate lines 41 simultaneously output a turn-on level, so that each first data lines 51 outputs a voltage of 0V to the first pixel electrode 201 in the corresponding first specific sub-pixel units 21, so as to prevent the problem of unstable voltage on the first pixel electrode 201 due to the leak current of the first thin-film transistor 31.

Figure 5:
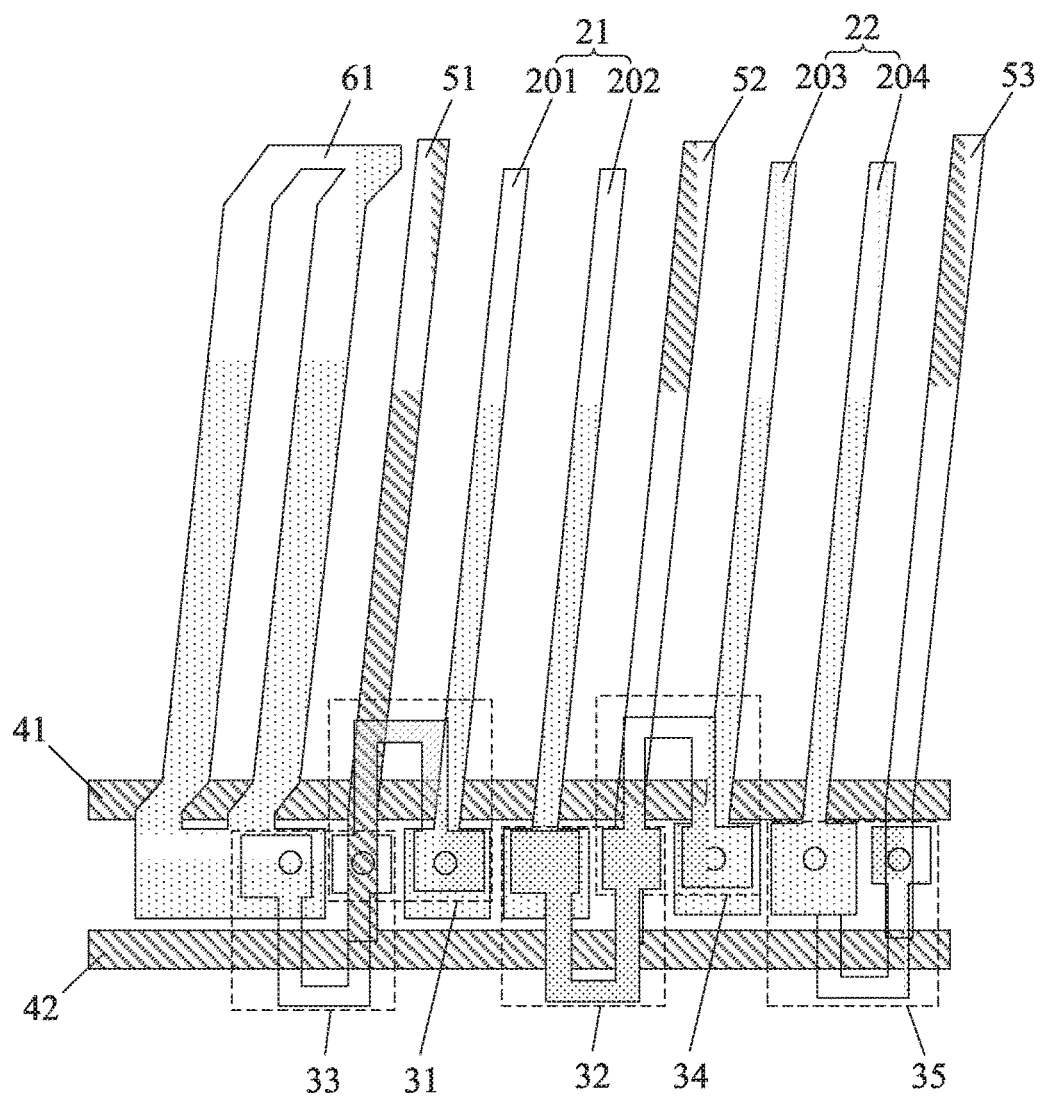
FIG. 5 illustrates a structural schematic diagram of a pixel unit of another array substrate according to an embodiment of the present disclosure.
Figure 6:
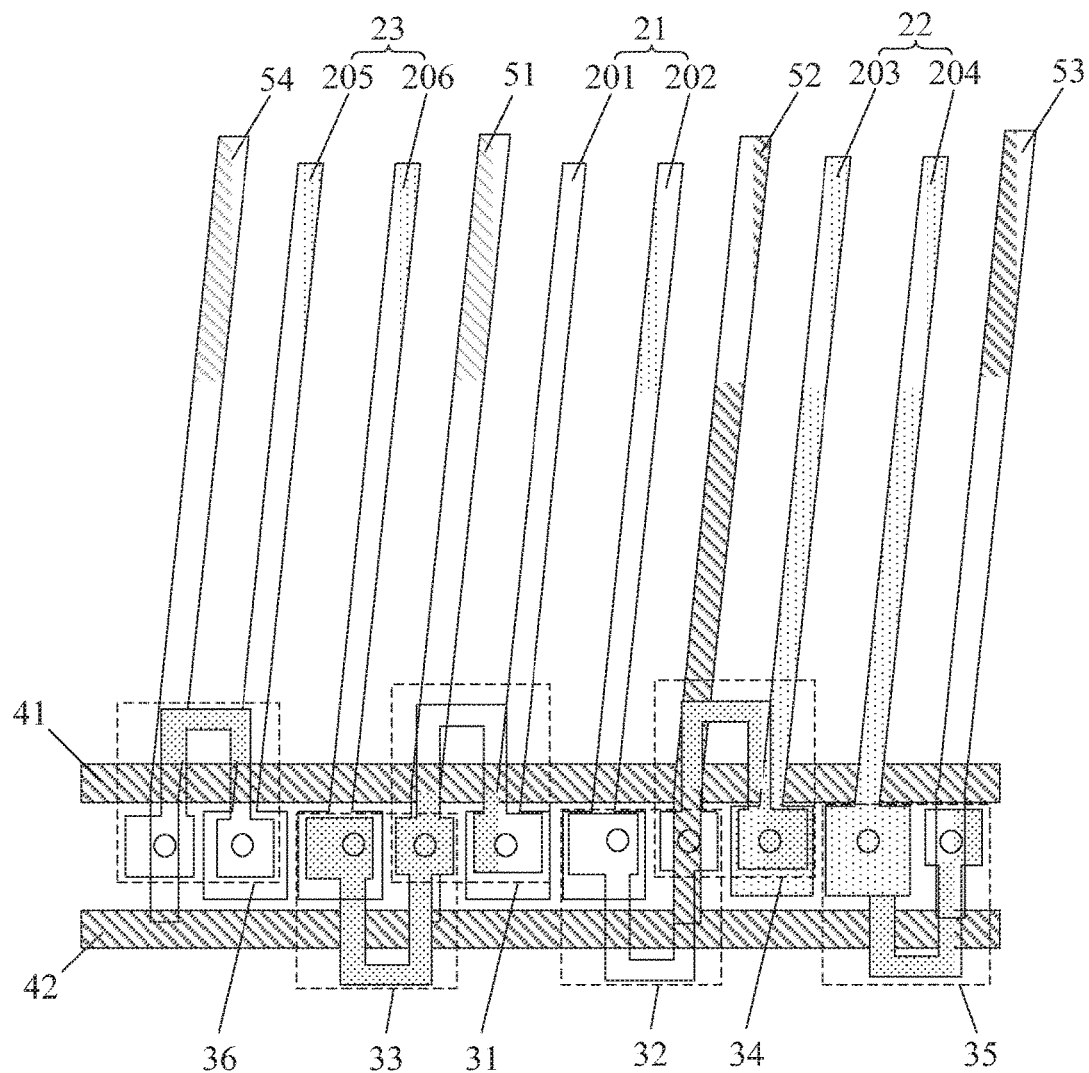
FIG. 6 illustrates a structural schematic diagram of a pixel unit of another array substrate according to an embodiment of the present disclosure.

Optionally, as shown in FIG. 5 or FIG. 6, FIG. 5 illustrate a structural schematic diagram of a pixel unit of an array substrate according to an embodiment of the present disclosure, and FIG. 6 illustrates a structural schematic diagram of a pixel unit of another array substrate according to an embodiment of the present disclosure. The array substrate further includes: a third data line 53, a fourth thin-film transistor 34 and a fifth thin-film transistor 35. Each pixel unit further includes a second specific sub-pixel unit 22 adjacent to the first specific sub-pixel unit 21, the second specific sub-pixel unit 22 includes a third pixel electrode 203 and a fourth pixel electrode 204 insulated from the third pixel electrode 203. The second data line 52 is located between the first specific sub-pixel unit 21 and the second specific sub-pixel unit 22 in the corresponding column of pixel units. The third data line 53 corresponds to each column of pixel units, and the third data line 53 is located at a side of the second specific sub-pixel unit 22 away from the first specific sub-pixel unit 21 in a corresponding column of pixel units. The source electrode of the fourth thin-film transistor 34 is electrically connected with the corresponding second data line 52, the drain electrode of the fourth thin-film transistor 34 is electrically connected with the corresponding third pixel electrode 203, and the gate electrode of the fourth thin-film transistor 35 is electrically connected with the corresponding first gate line 41. The source electrode of the fifth thin-film transistor 35 is electrically connected with the corresponding third data line 53, the drain electrode of the fifth thin-film transistor 35 is electrically connected with the corresponding fourth pixel electrode 204, and the gate electrode of the fifth thin-film transistor 35 is electrically connected with the corresponding second gate line 42. Under such configuration, the second pixel electrode 202 in the first specific sub-pixel unit 21 and the third pixel electrode 203 in the second specific sub-pixel unit 22 share a same second data line 52, which saves space for wiring the data line and thus improves transmittance. As shown in FIG. 5, each pixel unit further includes a first non-specific sub-pixel unit 61 adjacent to the first specific sub-pixel unit 21, and the first data line 51 is located between the first specific sub-pixel unit 21 and the first non-specific sub-pixel unit 61 in the corresponding column of pixel units. The array substrate further includes a third thin-film transistor 33 corresponding to each pixel unit. The source electrode of the third thin-film transistor 33 is electrically connected with a corresponding first data line 51, the drain electrode of the third thin-film transistor 33 is electrically connected with the pixel electrode of the corresponding first non-specific sub-pixel unit 61, and the gate electrode of the third thin-film transistor 33 is electrically connected with the corresponding second gate line 42. As shown in FIG. 6, each pixel unit further includes a third specific sub-pixel unit 23 adjacent to the first specific sub-pixel unit 21, the third specific sub-pixel unit 23 includes a fifth pixel electrode 205 and a sixth pixel electrode 206 insulated from the fifth pixel electrode 205. The first data line 51 is located between the first specific sub-pixel unit 21 and the third specific sub-pixel unit 23 in the corresponding column of pixel units. The array substrate further includes a third thin-film transistor 33, a sixth thin-film transistor 36 and a fourth data line 54 corresponding to each pixel unit. The source electrode of the third thin-film transistor 33 is electrically connected with the first data line 51, the drain electrode of the third thin-film transistor 33 is electrically connected with the sixth pixel electrode 206, the gate electrode of the third thin-film transistor 33 is electrically connected with the second gate line 42. The source electrode of the sixth thin-film transistor 36 is electrically connected with the fourth data line 54, the drain electrode of the sixth thin-film transistor 36 is electrically connected with the fifth pixel electrode 205, and the gate electrode of the sixth thin-film transistor 36 is electrically connected with the first gate line 41. The driving manner of the array substrate is illustrated based on the structure shown in FIG. 5. For example, in the normal display mode, when a row of pixel units are being charged, the first gate line 41 and the second gate line 42 corresponding to the row of pixel units successively output a turn-on level. When the first gate line 41 output a turn-on level, the data line outputs a corresponding data voltage to one pixel electrode in each specific sub-pixel unit; when the second gate line 42 outputs a turn-on level, the data line outputs a corresponding data voltage to the other pixel electrode in each specific sub-pixel unit, and meantime the data line outputs a corresponding data voltage to the pixel electrode of the first non-specific sub-pixel unit 61. After the charging of the row of pixel units is finished, a next row of pixel units will then be charged according to the same manner. It should be understood that, the normal display mode can also be driven in other manners. For example, the respective first gate lines 41 corresponding to all the rows of pixel units successively output a turn-on level, so that one pixel electrode in each specific sub-pixel unit will be charged. After the charging of the one pixel electrode in all the rows of specific sub-pixel units is finished, then the second gate lines 42 corresponding to all the rows of pixel units output a turn-on level, so that the other pixel electrode of all the rows of specific sub-pixel units and the pixel electrode of the non-specific sub-pixel unit will be charged. After the charging of all the pixel electrodes is finished, a next frame will be scanned according to the same manner. In the eye protection display mode, when one row of pixel unit is being charged, the first gate line 41 and the second gate line 42 corresponding to the row of pixel units successively output a turn-on level. When the first gate line 41 outputs a turn-on level, the first gate line 41 outputs a voltage of 0V to one pixel electrode of each specific sub-pixel unit; when the second gate line 42 outputs a turn-on level, the second gate line 42 outputs a corresponding data voltage to the other pixel electrode of each specific sub-pixel unit and the pixel electrode of the non-specific sub-pixel unit. After the charging of the row of pixel units is finished, a next row of pixel units will be charged according to the same manner. It should be understood that, the eye protection display mode can also be driven in other manners. For example, firstly, the second gate line 42 corresponding to each row of pixel units outputs a turn-on level, and outputs a corresponding data voltage to one pixel electrode in each specific sub-pixel unit and the pixel electrode in the non-specific sub-pixel unit, thereby normally scanning the display frame. During the normal scanning of the display picture, all the second gate line 42 output a turn-off level within a specific time, all the first gate lines 41 simultaneously output a turn-on level, and output a voltage of 0V to the other pixel electrode in each specific sub-pixel unit. The structure shown in FIG. 6 has three specific sub-pixel units, but no non-specific sub-pixel unit, and the driving manner of the specific sub-pixel unit is the same as the manner in FIG. 2, FIG. 4 and FIG. 5, which is not repeated herein.

Figure 7:
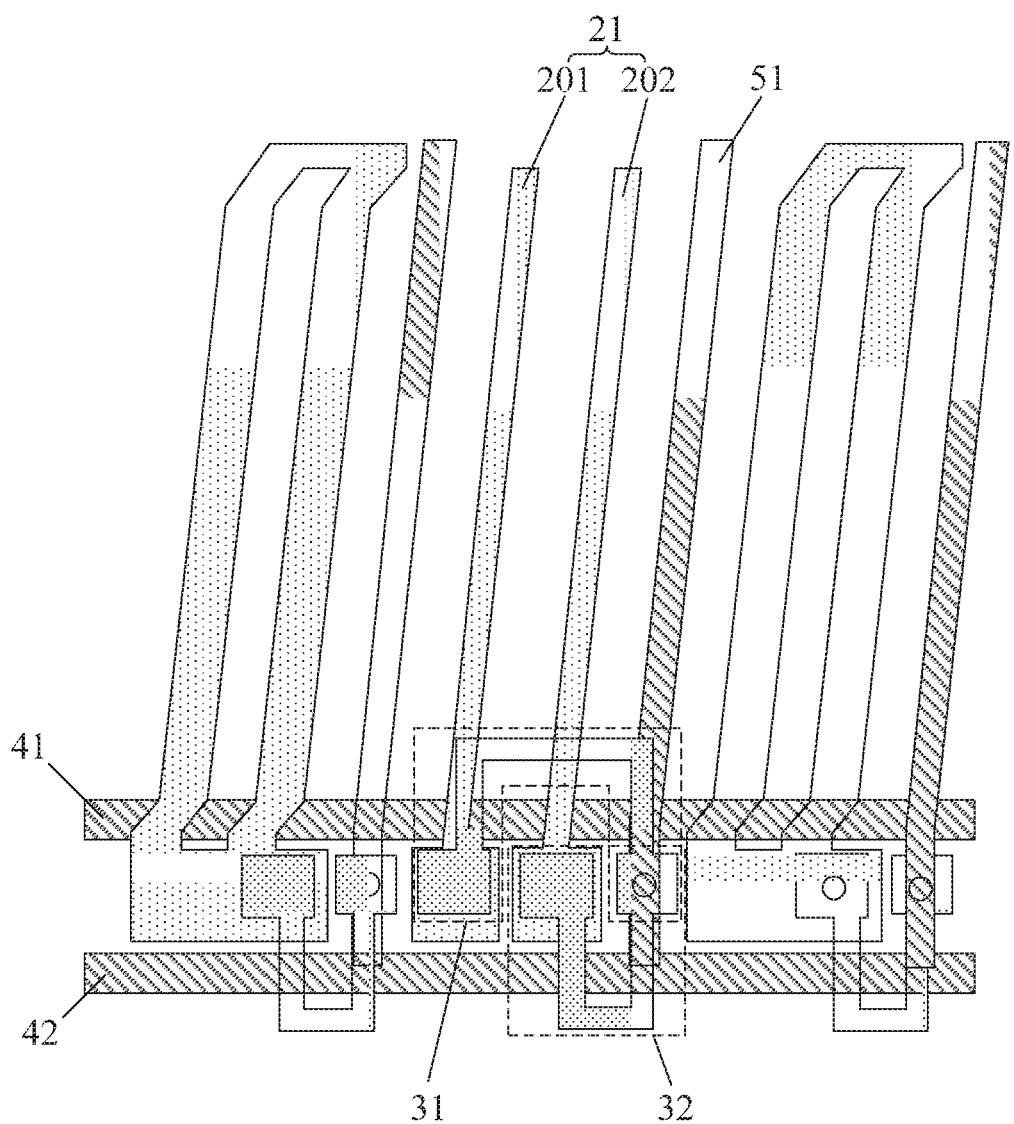
FIG. 7 illustrates a structural schematic diagram of a pixel unit of another array substrate according to an embodiment of the present disclosure.

Optionally, as shown in FIG. 7, FIG. 7 illustrates a structural schematic diagram of a pixel unit of another array substrate according to an embodiment of the present disclosure. The array substrate includes a first data line 51 corresponding to each column of pixel units. The source electrode of the first thin-film transistor 31 is electrically connected with the corresponding first data line 51, and the source electrode of the second thin-film transistor 32 is electrically connected with the corresponding first data line 51. In the structure shown in FIG. 2, FIG. 4, FIG. 5 and FIG. 6, the source electrode of the first thin-film transistor 31 and the source electrode of the source electrode of the second thin-film transistor 32 are electrically connected with the different data lines; while in the structure shown in FIG. 7, the source electrode of the first thin-film transistor 31 and the source electrode of the second thin-film transistor 32 are electrically connected with a same data line. The driving manner of the array substrate shown in FIG. 7 is illustrated as follows. For example, in the normal display mode, when one row of pixel units is being charged, the first gate line 41 and the second gate line 42 corresponding to the row of pixel units simultaneously output a turn-on level, so that the first data line 51 outputs an identical data voltage to the first pixel electrode 201 and the second pixel electrode 202. After the charging of the row of pixel units is finished, then a next row of pixel units will be charged according to the same manner. Accordingly, when the structure shown in FIG. 7 is in the normal display mode, during charging of one row of pixel units, it is merely necessary to simultaneously turn on the first gate line 41 and the second gate line 42 to accomplish the charging of the row of pixel units. However, when the structure shown in FIG. 2, FIG. 4, FIG. 5 and FIG. 6 is in the normal display mode, during charging of one row of pixel units, it is necessary to respectively turn on the first gate line 41 and the second gate line 42 twice to accomplish the charging of the row of pixel units. Therefore, the structure shown in FIG. 7 needs shorter charging time in the normal display mode, which can improve the refresh frequency during display. In the eye protection display mode, when one row of pixel units is being charged, the first gate line 41 and the second gate line 42 corresponding to the row of pixel units successively output a turn-on level. When the first gate line 41 outputs a turn-on level, the first data line 51 outputs a voltage of 0V to the first pixel electrode 201; when the second gate line 42 outputs a turn-on level, the first data line 51 outputs a corresponding data voltage to the second pixel electrode 202. After the charging of the row of pixel units is finished, a next row of pixel unit will be charged according to the same manner. It should be understood that, the eye protection display mode can also use other driving manners. For example, firstly, the second gate line 42 corresponding to each row of pixel units outputs a turn-on level, the first data line 51 outputs a corresponding data voltage to the second pixel electrode 202, thereby performing normal scanning of the display frame. During the normal scanning of the display frame, at a specific time, all the second gate lines 42 output a turn-off level, all the first gate lines 41 simultaneously output a turn-on level, and the first data lines 51 output a voltage of 0V to the first pixel electrode 201. It should be noted that, FIG. 7 only illustrates a structure in which one pixel unit includes one specific sub-pixel unit and two non-specific sub-pixel units, but the present disclosure has no limitation on the number of the sub-pixel unit in one pixel unit. For example, one pixel unit can include two specific sub-pixel unit and one non-specific sub-pixel unit, or one pixel unit includes three specific sub-pixel units. The driving manner of any other specific sub-pixel unit in each pixel unit is the same as the driving manner of the first specific sub-pixel unit, which is not repeated herein. The driving manner of the non-specific sub-pixel unit in each pixel unit is the same as the driving manner of the non-specific sub-pixel unit shown in FIG. 2, FIG. 4 and FIG. 5, which is not repeated herein.

Figure 8:
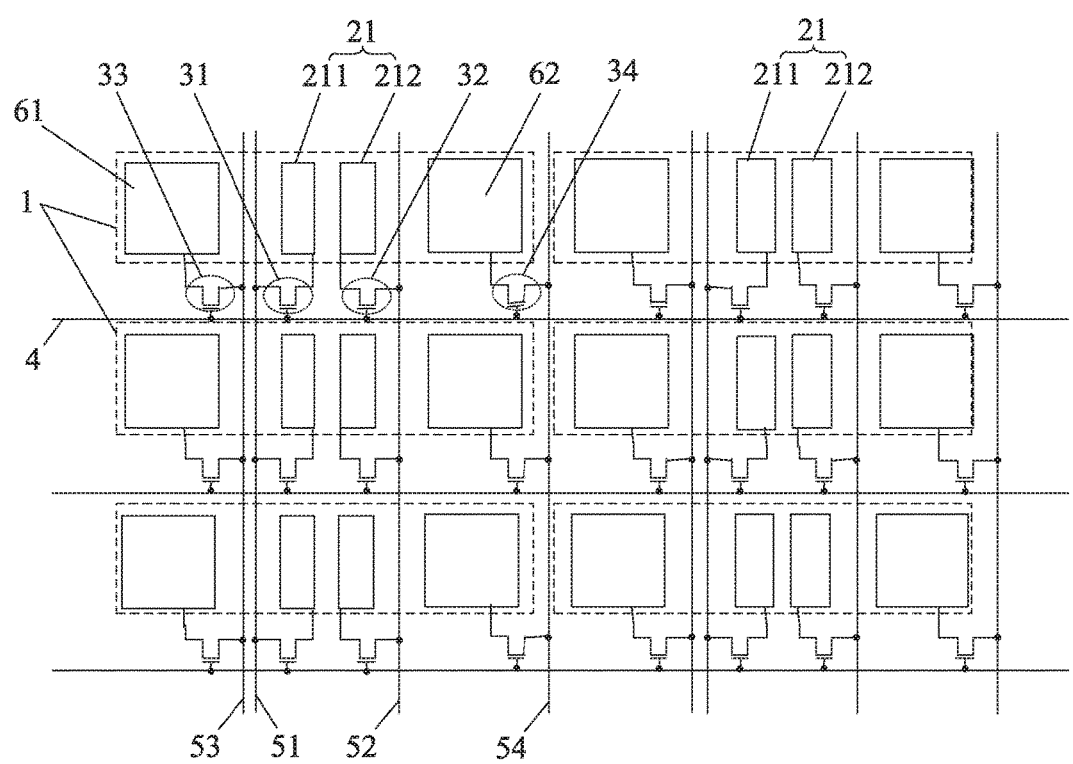
FIG. 8 illustrates a structural schematic diagram of another array substrate according to an embodiment of the present disclosure.
Figure 9:
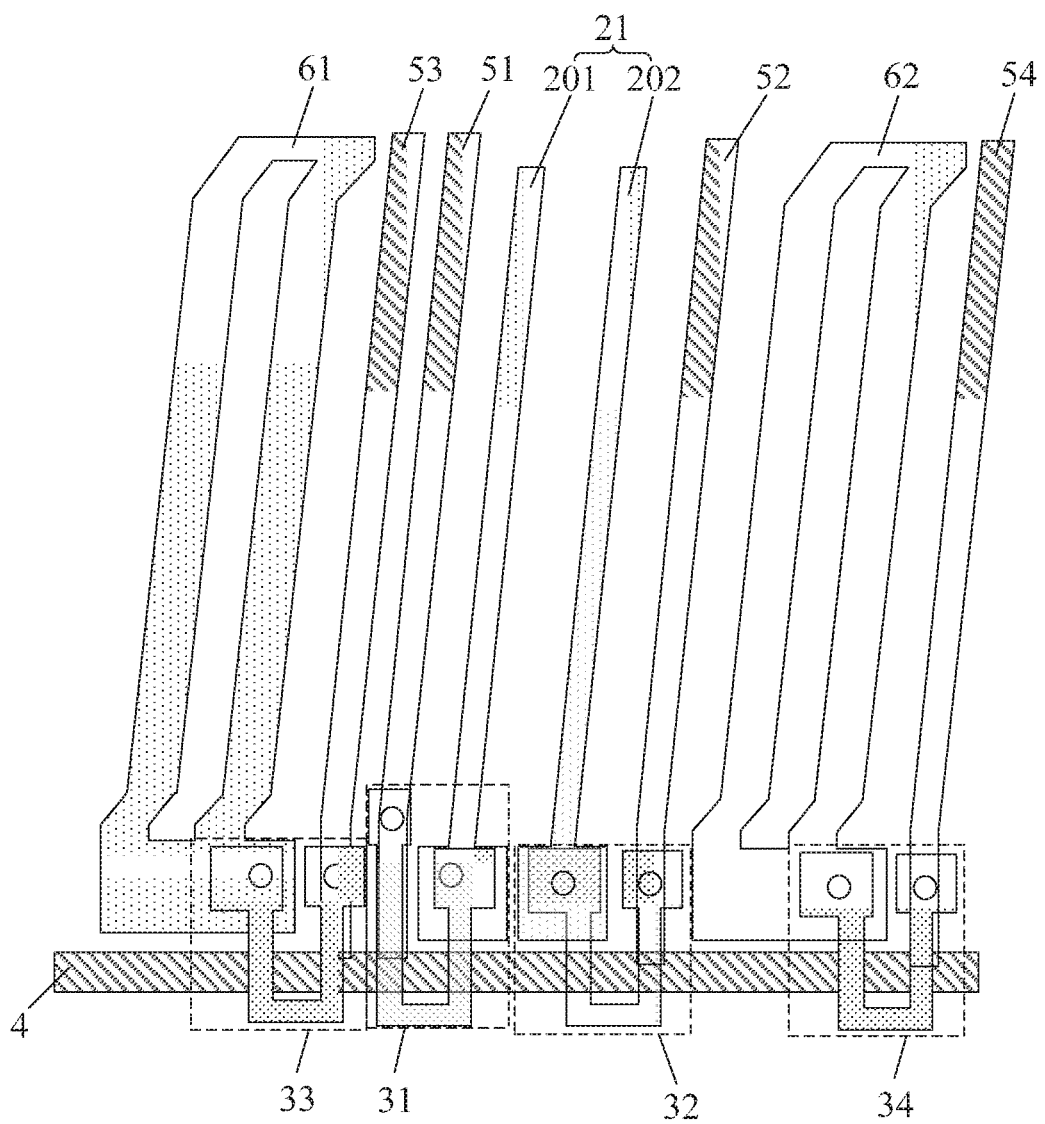
FIG. 9 illustrates a structural schematic diagram of one pixel unit shown in FIG. 8.

Optionally, as shown in FIG. 8 and FIG. 9, FIG. 8 illustrates a structural schematic diagram of another array substrate, and FIG. 9 illustrates a structural schematic diagram of one pixel unit shown in FIG. 8. The array substrate further includes a gate line 4 corresponding to each row of pixel units 1. In each row of pixel units 1, the gate electrode of the first thin-film transistor 31 and the gate electrode of the second thin-film transistor 32 are electrically connected with the corresponding gate line 4. In the structure shown in FIG. 8 and FIG. 9, in each row of pixel units, the first thin-film transistor 31 and the second thin-film transistor 32 share a same gate line 4, which reduces the number of the gate line, as compared with the structure shown in FIGS. 1-7.

Optionally, as shown in FIG. 8, any two adjacent rows of pixel units 1 are provided with one gate line 4 therebetween.

Optionally, as shown in FIG. 8 and FIG. 9, the array substrate further includes: a first data line 51 and a second data line 52, and the first data line 51 and the second data line 52 correspond to each row of the pixel units 1. In each pixel unit, the source electrode of the first thin-film transistor 31 is electrically connected with the corresponding first data line 51, and the source electrode of the second thin-film transistor 32 is electrically connected with the corresponding second data line 52. Since the first thin-film transistor 31 and the second thin-film transistor 32 are controlled by a same gate line 4, it is necessary to provide a first data line 51 and a second data line 52 respectively for the first pixel electrode 201 and the second pixel electrode 202. Moreover, in one row of the pixel units, the first data line 51 and the second data line 52 cannot be shared by any other pixel electrode in the same row. For example, in the structure shown in FIG. 8 and FIG. 9, each pixel unit further includes a first non-specific sub-pixel unit 61 and a second non-specific sub-pixel unit 62 adjacent to the first specific sub-pixel unit. The array substrate further includes a third thin-film transistor 33, a fourth thin-film transistor 34, a third data line 53 and a fourth data line 54, wherein the third thin-film transistor 33, the fourth thin-film transistor 34, the third data line 53 and the fourth data line 54 correspond to each of the pixel units 1. The source electrode of the third thin-film transistor 33 is electrically connected with the corresponding third data line 53, the drain electrode of the third thin-film transistor 33 is electrically connected with the pixel electrode of the corresponding first non-specific sub-pixel unit 61, and the gate electrode of the third thin-film transistor 33 is electrically connected with the corresponding gate line 4; the source electrode of the fourth thin-film transistor 34 is electrically connected with the corresponding fourth data line 54, the drain electrode of the fourth thin-film transistor 34 is electrically connected with the pixel electrode of the second non-specific sub-pixel unit 62, and the gate electrode of the fourth thin-film transistor 34 is electrically connected with the corresponding gate line 4. The driving manner of the array substrate shown in FIG. 8 and FIG. 9 is illustrated as follows. For example, in the normal display mode, all the gate lines 4 are successively turned on, so that corresponding data voltages are transmitted by the respective data lines to the respective pixel electrodes. In the eye protection display mode, all the gate lines 4 are successively turned on, the first data line 51 transmits a voltage of 0V to the first pixel electrode 201, and the other data lines respectively transmit a corresponding data voltage to the respective pixel electrodes. In the structure shown in FIG. 8 and FIG. 9, in each row of pixel units 1, each pixel electrode corresponds to one data line. Since the data line is not shared, the existing driving manner is also compatible. It should be noted that, FIG. 8 and FIG. 9 only illustrates a structure in which one pixel unit includes one specific sub-pixel unit and two non-specific sub-pixel units. It can be understood that, one pixel unit may include two specific sub-pixel units and one non-specific sub-pixel unit, or one pixel unit includes three specific sub-pixel units but no non-specific sub-pixel unit. The present disclosure has no limitation on the number of the non-specific sub-pixel unit in one pixel unit. Any other specific sub-pixel unit in one pixel unit can adopt the same configuration as the first specific sub-pixel unit, and the driving manner thereof can also be the same as that of the first specific sub-pixel unit, which is not repeated herein.

Optionally, as shown in FIGS. 1-9, the first specific sub-pixel unit 21 is a blue sub-pixel unit. That is, in the eye protection display mode, one pixel electrode in the blue sub-pixel unit in each pixel unit is kept at a voltage of 0V, and the objective of reducing transmittance of the blue light is realized by adjusting transmittance of the blue sub-pixel.

Optionally, as shown in FIG. 5 or FIG. 6, the second specific sub-pixel unit 22 is a green sub-pixel unit. That is, in the eye protection display mode, one pixel electrode in the blue sub-pixel unit and one pixel electrode in the green sub-pixel unit in each pixel unit are kept at a voltage of 0V, and the objective of reducing the transmittance of the blue light is realized by adjusting the transmittance of the blue sub-pixel and the green sub-pixel. It should be noted that, the red sub-pixel unit can also be the specific sub-pixel unit, that is, the objective of reducing the transmittance of the blue light is realized by adjusting the transmittance of the blue, green and red sub-pixel units.

It should be noted that, FIGS. 1-9 merely illustrate a structure in which one pixel unit includes three sub-pixel units, and the three sub-pixel units are generally the red, green and blue sub-pixel units, or, one pixel unit includes four sub-pixel units, and the four sub-pixel units are respectively the red, green, blue and white sub-pixel units. The present disclosure has no limitation on the number and color of the sub-pixel unit in one pixel unit.

In addition, the technical solution of the present disclosure is suitable for a display device having positive liquid crystal or negative liquid crystal. Compared with positive liquid crystal, when a lower pixel electrode voltage is used to realize the eye protection display mode in the prior art, the response time of the negative liquid crystal will be extended due to the higher viscosity of the negative liquid crystal, thereby causing more serious picture smear problem. That is, the technical solution in the embodiment is more suitable for the display device having negative liquid crystal, thus in the eye protection display mode, the problem of picture smear caused by the extension of the response time of the negative liquid crystal can be better solved. Further, the technical solution of the disclosure is suitable for a touch display device. The array substrate of the touch display device can include a plurality of touch electrodes distributed in a matrix, each touch electrode corresponds to one touch signal line, and the touch display device works alternatively between the display stage and the touch stage. In the display stage, a common electrode voltage is provided for each touch electrode, the touch electrode is also used as the common electrode which charges the pixel electrode in the display stage, and the common electrode and pixel electrode form an electric field therebetween to drive the liquid crystal to deflect, thereby realizing display function. In the touch stage, a pulse signal is provided for the touch electrode, and a touch position is determined by detecting a sensing signal on the touch electrode, thereby realizing the touch function. In order to realize a desired screen refresh frequency and the touch performance, since the charging time of the pixel electrode is limited, it is therefore necessary to rotate the liquid crystal to desired angle within the limited charging time of the pixel electrode. In the prior art, when a low pixel electrode voltage is used to realize the eye protection display mode, the response time of the liquid crystal is relatively long, thus, it is hard to rotate the liquid crystal to the desired angel, thus causing the problem of picture smear. In view of this, the technical solution of the present disclosure is more suitable the above described touch display device, and the problem of picture smear caused by the long response time of the liquid crystal can be better solved.

Figure 10:
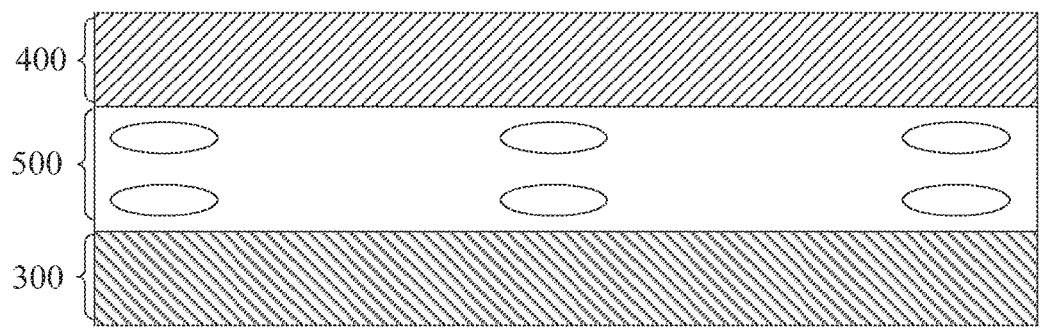
FIG. 10 illustrates a structural schematic diagram of a display panel according to an embodiment of the present disclosure.

As shown in FIG. 10, FIG. 10 illustrates a structural schematic diagram of a display panel according to an embodiment of the present disclosure. The embodiment of the present disclosure also provides a liquid crystal display panel, including the array substrate 300 as described above, a color film substrate 400 arranged opposite to the array substrate 300, and a liquid crystal layer 500 located between the array substrate 300 and color film substrate 400. When the liquid crystal display panel is displaying, the pixel electrode of the array substrate 300 and the common electrode form an electric field therebetween, so as to control the liquid crystal molecules in the liquid crystal layer 500 to rotate, thereby realizing the display function.

The configuration and principles of the array substrate 300 are the same as those described in the above embodiment, which are not repeated herein.

As for the liquid crystal display panel in the present embodiment, the first specific sub-pixel unit includes a first pixel electrode and a second pixel electrode insulated from the first pixel electrode. The first pixel electrode is controlled by a first thin-film transistor, and the second pixel electrode is controlled by a second thin-film transistor. When in the eye protection display mode, a voltage of 0V is transmitted to the first pixel electrode by the first thin-film transistor, and a data voltage is transmitted to the second pixel electrode by the second thin-film transistor. Thus, the liquid crystal corresponding to the first pixel electrode does not deflect, the liquid crystal corresponding to the second pixel electrode deflects with an angle corresponding to the data voltage, so that the first specific sub-pixel unit can emit light with a low transmittance. Compared with the prior art, the objective of reducing the transmittance is realized by disabling the deflection of the liquid crystal corresponding to the first pixel electrode, accordingly, there is no need to reduce the data voltage value of the pixel electrode for reducing the transmittance, therefore, while the transmittance is reduced to realize the eye protection display mode, the response time of the liquid crystal corresponding to the pixel electrode will not be extended due the reduction of the data voltage value, which therefore solves the problem of picture smear caused by the extension of the response time of the liquid crystal.

Figure 11:
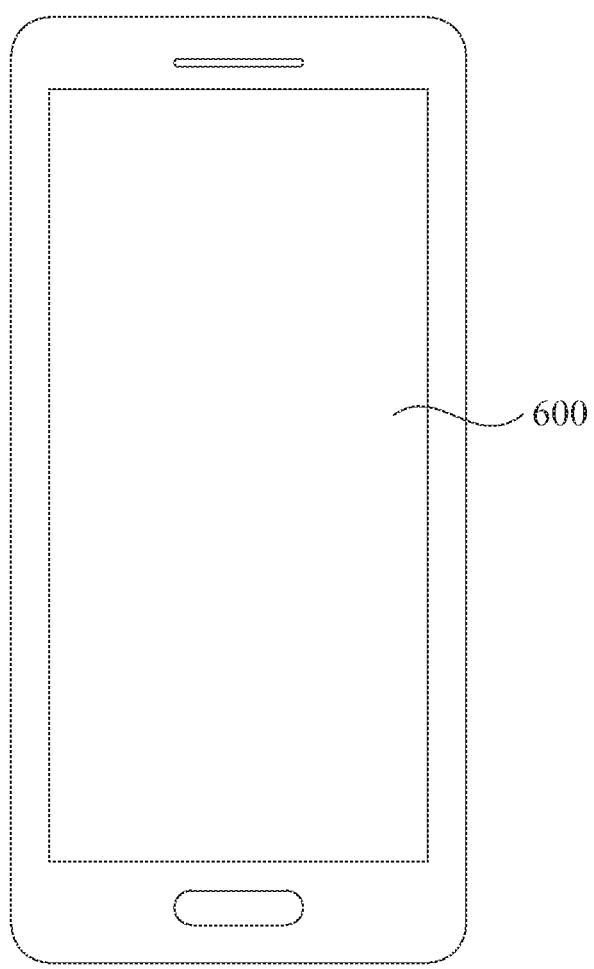
FIG. 11 illustrates a structural schematic diagram of a display device according to an embodiment of the present disclosure.

As shown in FIG. 11, FIG. 11 illustrates a structural schematic diagram of a display device according to an embodiment of the present disclosure. The embodiment provides a display device, including the liquid crystal display panel 600 as described above.

The configuration and principles of the liquid crystal display panel 600 are the same as those described in the above embodiment, which are not repeated herein. The display device can be any electronic device having display function, for example, touch display screen, cellphone, tablet computer, laptop, e-book, TV set, and the like.

In the display device of the present embodiment, the first specific sub-pixel unit includes a first pixel electrode and a second pixel electrode insulated from the first pixel electrode. The first pixel electrode is controlled by a first thin-film transistor, and the second pixel electrode is controlled by a second thin-film transistor. When in the eye protection display mode, a voltage of 0V is transmitted to the first pixel electrode by the first thin-film transistor, a data voltage is transmitted to the second pixel electrode by the second thin-film transistor. Thus, the liquid crystal corresponding to the first pixel electrode does not deflect, and the liquid crystal corresponding to the second pixel electrode deflects with an angle corresponding to the data voltage, so that the first specific sub-pixel unit can emit light with low transmittance. Compared with the prior art, the objective of reducing the transmittance is realized by disabling the deflection of the liquid crystal corresponding to the first pixel electrode, accordingly, there is no need to reduce the data voltage value of the pixel electrode for reducing the transmittance, therefore, while the transmittance is reduced to realize the eye protection display mode, the response time of the liquid crystal corresponding to the pixel electrode will not be extended due reduction of the data voltage value, which therefore solves the problem of picture smear caused by the extension of the response time of the liquid crystal.

An embodiment of the present disclosure further provides a pixel charging method, applied in the array substrate as described above, the method includes: as shown in FIG. 1-9, in the normal display mode, inputting an identical data voltage to the first pixel electrode 201 and the second pixel electrode 202; in the eye protection display mode, inputting a voltage of 0V to the first pixel electrode 201, and inputting a data voltage to the second pixel electrode 202.

The procedures and principle of the pixel charging method are as the same as those described above, which are not repeated herein.

In the pixel charging method of the present embodiment, the first specific sub-pixel unit includes a first pixel electrode and a second pixel electrode insulated from the first pixel electrode. The first pixel electrode is controlled by a first thin-film transistor, and the second pixel electrode is controlled by a second thin-film transistor. When in the eye protection display mode, a voltage of 0V is transmitted to the first pixel electrode by the first thin-film transistor, and a data voltage is transmitted to the second pixel electrode by the second thin-film transistor. Thus, the liquid crystal corresponding to the first pixel electrode does not deflect, the liquid crystal corresponding to the second pixel electrode deflects with an angle corresponding to the data voltage, so that the first specific sub-pixel unit can emit light with a low transmittance. Compared with the prior art, the objective of reducing the transmittance is realized by disabling the deflection of the liquid crystal corresponding to the first pixel electrode, accordingly, there is no need to reduce the data voltage value of the pixel electrode for reducing the transmittance, therefore, while the transmittance is reduced to realize the eye protection display mode, the response time of the liquid crystal corresponding to the pixel electrode will not be extended due the reduction of the data voltage value, which therefore improves the problem of picture smear caused by the extension of the response time of the liquid crystal.

The above are merely preferred embodiments of the present disclosure, which are not intended to limit the present disclosure. All modifications, equivalent substitutions and improvements made to the embodiments of the present disclosure within the spirit and principle of the present disclosure shall fall into the protection scope of the present disclosure.

What is claimed is:

1. An array substrate, comprising:
a plurality of pixel units distributed in a matrix;
a first thin-film transistor, and
a second thin-film transistor;
wherein the first thin-film transistor and the second thin-film transistor correspond to each of the plurality of pixel units;
each of the plurality of pixel units comprises a first specific sub-pixel unit, and the first specific sub-pixel unit comprises a first pixel electrode and a second pixel electrode insulated from the first pixel electrode; and
for each of the plurality of pixel units, a drain electrode of the first thin-film transistor is electrically connected with the first pixel electrode, and a drain electrode of the second thin-film transistor is electrically connected with the second pixel electrode,
wherein the array substrate further comprises:
a first gate line;
a second gate line;
a first data line, and
a second data line;
wherein the first gate line and the second gate line correspond to each row of the pixel units;
one of the first gate line and one of the second gate line are placed between any two adjacent rows of the pixel units; and
for each row of the pixel units, a gate electrode of the first thin-film transistor is electrically connected with a corresponding first gate line, and a gate electrode of the second thin-film transistor is electrically connected with a corresponding second gate line,
wherein the first data line and the second data line correspond to each column of the pixel units;
for each column of the pixel units, the first specific sub-pixel unit is placed between a corresponding first data line and a corresponding second data line;
a source electrode of the first thin-film transistor is electrically connected with a corresponding first data line, and a source electrode of the second thin-film transistor is electrically connected with a corresponding second data line,
wherein the array substrate further comprises a third thin-film transistor;
the third thin-film transistor corresponds to each of the plurality of pixel units;
each of the plurality of pixel units further comprises a non-specific sub-pixel unit adjacent to the first specific sub-pixel unit, the first data line is placed between the first specific sub-pixel unit and the non-specific sub-pixel unit in a corresponding column of the pixel units; and
a source electrode of the third thin-film transistor is electrically connected with a corresponding first data line, a drain electrode of the third thin-film transistor is electrically connected with a pixel electrode of a corresponding non-specific sub-pixel unit, and a gate electrode of the third thin-film transistor is electrically connected with a corresponding second gate line wherein a width of the pixel electrode of the specific sub-pixel is smaller than a width of the pixel electrode of the non-specific sub-pixel.

2. The array substrate according to claim 1, wherein each row of the pixel units is placed between a corresponding first gate line and a corresponding second gate line.

3. The array substrate according to claim 1, wherein each row of the pixel units is placed on a same side of a corresponding first gate line and a corresponding second gate line.

4. The array substrate according to claim 1, further comprising:
a third data line,
a fourth thin-film transistor, and
a fifth thin-film transistor;

wherein the third data line corresponds to each column of the pixel units;
the fourth thin-film transistor and the fifth thin-film transistor correspond to each pixel unit,
each of the plurality of pixel units further comprises a second specific sub-pixel unit adjacent to the first specific sub-pixel unit, the second specific sub-pixel unit comprises a third pixel electrode and a fourth pixel electrode insulated from the third pixel electrode, the second data line is placed between the first specific sub-pixel unit and the second specific sub-pixel unit in a corresponding column of the pixel units;
the third data line is placed at a side of the second specific sub-pixel unit away from the first specific sub-pixel unit in a corresponding column of the pixel units;
a source electrode of the fourth thin-film transistor is electrically connected with a corresponding second data line, a drain electrode of the fourth thin-film transistor is electrically connected with a corresponding third pixel electrode, a gate electrode of the fourth thin-film transistor is electrically connected with a corresponding first gate line; and
a source electrode of the fifth thin-film transistor is electrically connected with a corresponding third data line, a drain electrode of the fifth thin-film transistor is electrically connected with a corresponding fourth pixel electrode, a gate electrode of the fifth thin-film transistor is electrically connected with a corresponding second gate line.

5. The array substrate according to claim 1, further comprising:
a first data line;
wherein the first data line corresponds to each column of the pixel units; and
a source electrode of the first thin-film transistor is electrically connected with a corresponding first data line, and a source electrode of the second thin-film transistor is electrically connected with a corresponding first data line.

6. The array substrate according to claim 1, further comprising:
a gate line;
wherein the gate line corresponds to each row of the pixel units; and
for each row of the pixel units, a gate electrode of the first thin-film transistor and a gate electrode of the second thin-film transistor are electrically connected with a corresponding gate line.

7. The array substrate according to claim 6, wherein, one of the gate line is placed between any two adjacent rows of the pixel units.

8. The array substrate according to claim 6, further comprising
a first data line, and
a second data line;
wherein the first data line and the second data line correspond to each column of the pixel units;
for each of the plurality of pixel units, a source electrode of the first thin-film transistor is electrically connected with a corresponding first data line, and a source electrode of the second thin-film transistor is electrically connected with a corresponding second data line.

9. The array substrate according to claim 1, wherein the first specific sub-pixel unit is a blue sub-pixel unit.

10. The array substrate according to claim 4, wherein the second specific sub-pixel unit is a green sub-pixel unit.

11. A liquid crystal display panel, comprising an array substrate, wherein the array substrate comprises:
a plurality of pixel units distributed in a matrix;
a first thin-film transistor, and
a second thin-film transistor;
wherein the first thin-film transistor and the second thin-film transistor correspond to each of the plurality of pixel units;
each of the plurality of pixel units comprises a first specific sub-pixel unit, and the first specific sub-pixel unit comprises a first pixel electrode and a second pixel electrode insulated from the first pixel electrode; and
for each of the plurality of pixel units, a drain electrode of the first thin-film transistor is electrically connected with the first pixel electrode, and a drain electrode of the second thin-film transistor is electrically connected with the second pixel electrode,
wherein the array substrate further comprises:
a first gate line;
a second gate line;
a first data line, and
a second data line;
wherein the first gate line and the second gate line correspond to each row of the pixel units;
one of the first gate line and one of the second gate line are placed between any two adjacent rows of the pixel units; and
for each row of the pixel units, a gate electrode of the first thin-film transistor is electrically connected with a corresponding first gate line, and a gate electrode of the second thin-film transistor is electrically connected with a corresponding second gate line,
wherein the first data line and the second data line correspond to each column of the pixel units;
for each column of the pixel units, the first specific sub-pixel unit is placed between a corresponding first data line and a corresponding second data line;
a source electrode of the first thin-film transistor is electrically connected with a corresponding first data line, and a source electrode of the second thin-film transistor is electrically connected with a corresponding second data line,
wherein the array substrate further comprises a third thin-film transistor;
the third thin-film transistor corresponds to each of the plurality of pixel units;
each of the plurality of pixel units further comprises a non-specific sub-pixel unit adjacent to the first specific sub-pixel unit, the first data line is placed between the first specific sub-pixel unit and the non-specific sub-pixel unit in a corresponding column of the pixel units; and
a source electrode of the third thin-film transistor is electrically connected with a corresponding first data line, a drain electrode of the third thin-film transistor is electrically connected with a pixel electrode of a corresponding non-specific sub-pixel unit, and a gate electrode of the third thin-film transistor is electrically connected with a corresponding second gate line wherein a width of the pixel electrode of the specific sub-pixel is smaller than a width of the pixel electrode of the non-specific sub-pixel.

12. A pixel charging method, for application in an array substrate, the array substrate comprising:
a plurality of pixel units distributed in a matrix;
a first thin-film transistor, and
a second thin-film transistor;

wherein the first thin-film transistor and the second thin-film transistor correspond to each of the plurality of pixel units;

each of the plurality of pixel units comprises a first specific sub-pixel unit, and the first specific sub-pixel unit comprises a first pixel electrode and a second pixel electrode insulated from the first pixel electrode; and for each of the plurality of pixel units, a drain electrode of the first thin-film transistor is electrically connected with the first pixel electrode, and a drain electrode of the second thin-film transistor is electrically connected with the second pixel electrode, wherein the array substrate further comprises:

a first gate line;

a second gate line;

a first data line, and a second data line;

wherein the first gate line and the second gate line correspond to each row of the pixel units;

one of the first gate line and one of the second gate line are placed between any two adjacent rows of the pixel units; and for each row of the pixel units, a gate electrode of the first thin-film transistor is electrically connected with a corresponding first gate line, and a gate electrode of the second thin-film transistor is electrically connected with a corresponding second gate line, wherein the first data line and the second data line correspond to each column of the pixel units;

for each column of the pixel units, the first specific sub-pixel unit is placed between a corresponding first data line and a corresponding second data line;

a source electrode of the first thin-film transistor is electrically connected with a corresponding first data line, and a source electrode of the second thin-film transistor is electrically connected with a corresponding second data line;

wherein the array substrate further comprises a third thin-film transistor;

the third thin-film transistor corresponds to each of the plurality of pixel units;

each of the plurality of pixel units further comprises a non-specific sub-pixel unit adjacent to the first specific sub-pixel unit, the first data line is placed between the first specific sub-pixel unit and the non-specific sub-pixel unit in a corresponding column of the pixel units; and a source electrode of the third thin-film transistor is electrically connected with a corresponding first data line, a drain electrode of the third thin-film transistor is electrically connected with a pixel electrode of a corresponding non-specific sub-pixel unit, and a gate electrode of the third thin-film transistor is electrically connected with a corresponding second gate line;

wherein the pixel charging method comprises:

in a normal display mode, inputting an identical data voltage to the first pixel electrode and the second pixel electrode; and in an eye protection display mode, inputting a voltage of 0V to the first pixel electrode, and inputting a data voltage to the second pixel electrode wherein a width of the pixel electrode of the specific sub-pixel is smaller than a width of the pixel electrode of the non-specific sub-pixel.

\* \* \* \* \*